United States Patent
Nukaga

(10) Patent No.: US 10,711,121 B2
(45) Date of Patent: Jul. 14, 2020

(54) RUBBER COMPOSITION AND TIRE

(71) Applicant: BRIDGESTONE CORPORATION, Tokyo (JP)

(72) Inventor: Hideyuki Nukaga, Hino (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 49 days.

(21) Appl. No.: 16/061,174

(22) PCT Filed: Jan. 19, 2017

(86) PCT No.: PCT/JP2017/001809
§ 371 (c)(1),
(2) Date: Jun. 11, 2018

(87) PCT Pub. No.: WO2017/126629
PCT Pub. Date: Jul. 27, 2017

(65) Prior Publication Data
US 2018/0355155 A1   Dec. 13, 2018

(30) Foreign Application Priority Data

Jan. 19, 2016   (JP) ................... 2016-008200

(51) Int. Cl.
| | |
|---|---|
| C08L 9/06 | (2006.01) |
| B60C 1/00 | (2006.01) |
| C08K 3/04 | (2006.01) |
| C08K 3/36 | (2006.01) |
| C08L 7/00 | (2006.01) |
| C08L 15/00 | (2006.01) |
| C08L 9/00 | (2006.01) |
| C08K 3/08 | (2006.01) |
| C08K 7/02 | (2006.01) |

(52) U.S. Cl.
CPC ............... C08L 9/06 (2013.01); B60C 1/00 (2013.01); C08K 3/04 (2013.01); C08K 3/08 (2013.01); C08K 3/36 (2013.01); C08K 7/02 (2013.01); C08L 7/00 (2013.01); C08L 9/00 (2013.01); C08L 15/00 (2013.01); C08L 2205/02 (2013.01); C08L 2205/025 (2013.01); C08L 2205/03 (2013.01)

(58) Field of Classification Search
CPC ........ C08L 2205/03; C08L 9/00; C08L 15/00; B60C 1/00; C08K 3/04; C08K 3/36; C08K 3/08
USPC ......................................................... 523/155
See application file for complete search history.

(56) References Cited

U.S. PATENT DOCUMENTS

| | | |
|---|---|---|
| 6,472,461 B1 | 10/2002 | Nakamura et al. |
| 2005/0209393 A1 | 9/2005 | Hochi |
| 2007/0149653 A1 | 6/2007 | Sugio et al. |
| 2007/0185253 A1 | 8/2007 | Suzuki |
| 2010/0000639 A1* | 1/2010 | Randall ............ B60C 1/0016 152/209.1 |
| 2010/0105827 A1 | 4/2010 | Tanaka et al. |
| 2012/0053263 A1 | 3/2012 | Miyazaki |
| 2013/0137807 A1 | 5/2013 | Miyazaki |
| 2015/0031790 A1 | 1/2015 | Obrecht et al. |
| 2015/0148447 A1 | 5/2015 | Takeda |
| 2015/0183953 A1 | 7/2015 | Shiraishi et al. |

FOREIGN PATENT DOCUMENTS

| | | |
|---|---|---|
| CN | 1890343 A | 1/2007 |
| CN | 101600737 A | 12/2009 |
| CN | 102382342 A | 3/2012 |
| CN | 104245817 A | 12/2014 |
| CN | 104487507 A | 4/2015 |
| EP | 1 911 797 A1 | 4/2008 |
| EP | 2 716 700 A1 | 4/2014 |
| JP | 2001-011237 A | 1/2001 |
| JP | 2004-168903 A | 6/2004 |
| JP | 2004-238619 A | 8/2004 |
| JP | 2005-263893 A | 9/2005 |
| JP | 2008-303334 A | 12/2008 |
| JP | 2011-088988 A | 5/2011 |
| JP | 2011-089066 A | 5/2011 |
| JP | 2011-094031 A | 5/2011 |
| JP | 2012-46602 * | 3/2012 |
| JP | 2012-046602 A | 3/2012 |

(Continued)

OTHER PUBLICATIONS

Machine translation of WO 2012 160938 (Year: 2012).*

(Continued)

Primary Examiner — Doris L Lee
(74) Attorney, Agent, or Firm — Sughrue Mion, PLLC

(57) ABSTRACT

A rubber composition has: at least three types of diene polymers forming a plurality of polymer phases immiscible with each other; and silica, wherein: a diene polymer (B), of which glass transition temperature (Tg) is neither the highest nor the lowest among the diene polymers each having content of ≥10% by mass with respect to the total mass of the diene polymers, has been modified by a compound containing silicon atom; the diene polymer (B) satisfies formula (i) shown below:

$$St + Vi/2 \leq 33 \qquad (i)$$

(In the formula, "St" represents content of bonded styrene (mass %) of the diene polymer (B) and "Vi" represents vinyl bond content (mass %) of a conjugated diene compound part of the diene polymer (B)); and the silica has content of ≥25 parts by mass with respect to the total mass or 100 parts by mass of the diene polymers.

20 Claims, No Drawings

(56) References Cited

FOREIGN PATENT DOCUMENTS

| | | |
|---|---|---|
| JP | 2012-136581 A | 7/2012 |
| JP | 2013-035902 A | 2/2013 |
| RU | 2 279 988 C2 | 7/2006 |
| WO | 2012/160938 A1 | 11/2012 |
| WO | WO 2012/160938 * | 11/2012 |
| WO | 2012/176538 A1 | 12/2012 |

OTHER PUBLICATIONS

Machine translation of JP 2012-46602 (Year: 2012).*
Communication dated Apr. 29, 2019 from Russian Patent Office in counterpart RU Application No. 2018129899/05.
Extended European Search Report dated Nov. 21, 2018 in European Patent Application No. 17741506.4 (PCT/JP2017/001809).
International Search Report for PCT/JP2017/001809 dated Apr. 11, 2017.
Communication dated Dec. 3, 2019, from The China National Intellectual Property Administration in Application No. 201780007295.7.

* cited by examiner

RUBBER COMPOSITION AND TIRE

CROSS REFERENCE TO RELATED APPLICATIONS

This application is a National Stage of International Application No. PCT/JP2017/001809 filed Jan. 19, 2017, claiming priority based on Japanese Patent Application No. 2016-008200 filed Jan. 19, 2016.

TECHNICAL FIELD

The present invention relates to a rubber composition and a tire.

BACKGROUND

There has been conventionally used a studless tire having relatively soft tread rubber as a tire for safely running on ice, as well as a dry road surface. It is known that on-ice performance of a tire improves when tread rubber of the tire is made relatively soft. However, a tire having soft tread rubber generally has a problem in that the tire exhibits poor wear resistance on a dry road surface. In short, on-ice performance and wear resistance of a tire cannot be improved at the same time in a compatible manner.

Examples of a known technique for improving on-ice performance of a tire include blending organic fibers, glass fibers or the like with a rubber composition for use in a tread of the tire so that the organic fibers, glass fibers or the like scratch an icy road surface and improve on-ice performance of the tire. However, such organic fibers, glass fibers or the like, exhibiting no interaction with rubber, rather function as starting points of breakage and tend to deteriorate fracture resistance (wear resistance) of tread rubber. It is therefore difficult to blend a satisfactory amount of organic fibers, glass fibers or the like with a rubber composition. That is, it is difficult to improve on-ice performance of a tire in a satisfactory manner by adding organic fibers, glass fibers or the like to tread rubber thereof.

PTL1 proposes as a tire for solving the aforementioned problems a rubber composition containing 0.5-20 parts by weight of potassium titanate fiber and 5-200 parts by weight of carbon black having 100-300 mg/g of iodine adsorption amount, with respect to 100 parts by weight of a rubber component comprising natural rubber and butadiene rubber. PTL 1 reports that use of the rubber composition in a cap tread layer of two-layered tread including cap tread and base tread improves performance on ice (and snow), while well suppressing deterioration of wear resistance of the tire.

CITATION LIST

Patent Literature

PTL 1: JP 2008-303334 A

SUMMARY

Technical Problem

However, as is disclosed in Table 1 of PTL 1, use of the rubber composition containing potassium titanate fiber by a specific range of content in cap tread of a tire does not improve performance on ice (friction coefficient on ice) of the tire in a satisfactory manner and there still exists room for improvement in this regard.

In view of this, an object of the present disclosure is to provide a rubber composition capable of solving the prior art problems described above and significantly improving on-ice performance of a tire.

Further, another object of the present disclosure is to provide a tire exhibiting good on-ice performance.

Solution to Problem

Primary features of the present disclosure for solving the prior art problems are as follows.

A rubber composition of the present disclosure comprises: at least three types of diene polymers forming a plurality of polymer phases which are immiscible with each other; and silica, wherein:

each of the at least three types of diene polymers has content of ≥10% by mass with respect to the total mass of the diene polymers;

content of the diene polymer (A) having the lowest glass transition temperature (Tg) among the diene polymers each having content of ≥10% by mass with respect to the total mass of the diene polymers is ≥85% by mass with respect to the content of the diene polymer having the highest content among the diene polymers other than the diene polymer (A);

among the diene polymers each having content of ≥10% by mass with respect to the total mass of the diene polymers, the diene polymer (C) has the highest class transition temperature (Tg) and a diene polymer (B), which is other than the diene polymer (A) and has glass transition temperature (Tg) lower than that of the diene polymer (C) having the highest glass transition temperature (Tg), has been modified by a compound containing silicon atom; the diene polymer (B) is a copolymer of a conjugated diene compound and styrene and satisfies formula (i) shown below:

$$St+Vi/2 \leq 33 \quad (i)$$

(In the formula, "St" represents content of bonded styrene (mass %) of the diene polymer (B) and "Vi" represents vinyl bond content (mass %) of the conjugated diene compound part of the diene polymer (B)); and the silica has content of ≥25 parts by mass with respect to the total mass or 100 parts by mass of the diene polymers.

It is possible to significantly improve on-ice performance of a tire by applying the rubber composition of the present disclosure to the tire.

Immiscibility of the polymer phases is evaluated in the present disclosure by: processing a rubber composition to be examined into a sheet-like configuration by using a roll for the test; subjecting the sheet to pressure vulcanization by using a mold (15 cm×15 cm×1 cm) for the test at 150° C. for 30 minutes, to prepare a vulcanized rubber sheet; cutting the vulcanized rubber sheet by a microtome, thereby obtaining an ultrathin slice of the vulcanized rubber sheet; and observing the slice thus obtained by using a scanning probe microscope. The polymer phases are judged to be immiscible with each other when a phase-separated structure is confirmed in the slice.

Glass transition temperature (Tg) of the diene polymer in the present disclosure is represented by extrapolated onset temperature (Tf) measured by using a differential scanning calorimeter (DSC) according to ASTM D3418-82.

Further, content of bonded styrene and vinyl bond content of the diene polymer is determined from integration ratios of $^1$H-NMR spectra in the present disclosure.

The diene polymer (A) having the lowest glass transition temperature (Tg) has a butadiene skeleton in a preferable example of the rubber composition according to the present disclosure. The rubber composition is made relatively soft in this case, thereby increasing a ground-contact area and improving on-ice performance of a tire when the rubber composition is used in a tread of the tire.

The diene polymer (A) having the lowest glass transition temperature (Tg) is preferably polybutadiene because then the rubber composition is made further soft, thereby further increasing a ground-contact area and thus further improving on-ice performance of the tire.

The diene polymer (B) has a styrene skeleton and a butadiene skeleton in another preferable example of the rubber composition according to the present disclosure. The diene polymer (B) exhibits better compatibility with the diene polymer (C) having the highest glass transition temperature (Tg) in this case.

The diene polymer (B) is preferably styrene-butadiene copolymer rubber because then the diene polymer (B) exhibits even better compatibility with the diene polymer (C).

The diene polymer (C) having the highest glass transition temperature (Tg) has an isoprene skeleton in yet another preferable example of the rubber composition according to the present disclosure. The rubber composition exhibits better reinforcing properties and thus better wear resistance in this case.

The diene polymer (C) having the highest glass transition temperature (Tg) is preferably natural rubber. The rubber composition exhibits even better reinforcing properties and thus even better wear resistance in this case.

The rubber composition preferably contains 25 parts by mass or more of carbon black with respect to the total mass or 100 parts by mass of the diene polymers. A relatively large proportion of carbon black, which exhibits good reinforcing properties, is distributed to the polymer phase formed by the diene polymer having the lowest glass transition temperature (Tg), whereby wear resistance of the rubber composition improves.

It is preferable in the rubber composition according to the present disclosure that the diene polymer (A) having the lowest glass transition temperature (Tg) has been modified by a compound containing at least one of tin atom and nitrogen atom. Wear resistance of the rubber composition improves in this case.

It is further preferable in this regard that the diene polymer (A) having the lowest glass transition temperature (Tg) contains both tin atom and nitrogen atom because then wear resistance of the rubber composition further improves.

Further, it is preferable that a modification rate at which the diene polymer (A) having the lowest glass transition temperature (Tg) has been modified by the compound containing at least one of tin atom and nitrogen atom is in the range of ≥1.1 and ≤2.5. Wear resistance of the rubber composition improves in a satisfactory manner, while viscosity thereof decreases and workability thereof improves in an unvulcanized state, in this case.

A "modification rate" of the diene polymer (A) represents milimoles of the compound containing at least one of tin atom (Sn) and nitrogen atom (N), used in a modification reaction, per 100 g of a rubber component of the diene polymer (A).

It is preferable that the rubber composition according to the present disclosure further contains a foaming agent. It is possible, by manufacturing a tire by using in tread rubber thereof the rubber composition containing a foaming agent, to form gas bubbles derived from the foaming agent in the tread rubber when a green tire is vulcanized, thereby further improving on-ice performance of the tire by a scratching effect and a drainage effect caused by the gas bubbles (-derived holes) in a tread.

It is preferable that the rubber composition according to the present disclosure has gas bubble-derived holes formed therein. It is possible, by using the rubber composition having gas bubble-derived holes therein in tread rubber of a tire, to further improve on-ice performance of the tire by a scratching effect and a drainage effect caused by the gas bubble-derived holes in a tread of the tire.

It is preferable that the rubber composition according to the present disclosure further contains a $C_5$ resin. On-ice performance of a tire can be further improved by this arrangement.

It is preferable that the rubber composition according to the present disclosure further contains hydrophilic short fibers. On-ice performance of a tire can be highly improved by this arrangement.

Further, a tire of the present disclosure is characterized in that it uses the rubber composition described above. The tire according to the present disclosure exhibits good performance on ice because it uses the rubber composition described above.

Advantageous Effect

According to the present disclosure, it is possible to provide a rubber composition capable of significantly improving on-ice performance of a tire.

Further, according to the present disclosure, it is possible to provide a tire exhibiting good performance on ice.

DETAILED DESCRIPTION

<Rubber Composition>

A rubber composition of the present disclosure will be described in detail hereinafter by an embodiment thereof.

The rubber composition has: at least three types of diene polymers forming a plurality of polymer phases which are immiscible with each other; and silica, wherein: each of the at least three types of diene polymers has content of ≥10% by mass with respect to the total mass of the diene polymers; content of the diene polymer (A) having the lowest glass transition temperature (Tg) among the diene polymers each having content of ≥10% by mass with respect to the total mass of the diene polymers is ≥85% by mass with respect to the content of the diene polymer having the highest content among the diene polymers other than the diene polymer (A); among the diene polymers each having content of ≥10% by mass with respect to the total mass of the diene polymers, the diene polymer (C) has the highest glass transition temperature (Tg) and a diene polymer (B), which is other than the diene polymer (A) and has glass transition temperature (Tg) lower than that of the diene polymer (C) having the highest glass transition temperature (Tg), has been modified by a compound containing silicon atom; the diene polymer (B) is a copolymer of a conjugated diene compound and styrene and satisfies formula shown below:

$$St+Vi/2 \leq 33 \qquad (i)$$

(In the formula, "St" represents content of bonded styrene (mass %) of the diene polymer (B) and "Vi" represents vinyl bond content (mass %) of the conjugated diene compound part of the diene polymer (B)); and the silica has content of ≥25 parts by mass with respect to the total mass or 100 parts by mass of the diene polymers.

The rubber composition of the present disclosure contains at least three types of diene polymers, and a polymer blend constituted of the at least three types of diene polymers forms a plurality of polymer phases which are immiscible with each other. Further, in the rubber composition of the present disclosure, among the diene polymers each having content of ≥10% by mass with respect to the total mass of the diene polymers, the diene polymer (C) has the highest glass transition temperature (Tg) and a diene polymer (B), which is other than the diene polymer (A) having the lowest glass transition temperature (Tg) and has glass transition temperature (Tg) lower than that of the diene polymer (C) having the highest glass transition temperature (Tg), satisfies formula (i) shown above, whereby the diene polymer (B) exhibits high compatibility with the diene polymer (C) having the highest glass transition temperature (Tg). As a result, a polymer phase including the diene polymer (C) having the highest glass transition temperature (Tg) includes the diene polymer (B), as well. Further, the dine polymer (B), which has been modified by a compound containing silicon atom, exhibits relatively strong interaction with silica, whereby a large portion of silica is distributed to a polymer phase including the diene polymer (B). Said polymer phase formed by the diene polymers having relatively high glass transition temperature (Tg) and inherently good reinforcing properties (i.e. the diene polymer (C), the diene polymer (B) and the like) has high wear resistance. Moreover, said polymer phase is soft and has minute irregularities due to containing of a relatively large amount of silica. Accordingly, the rubber composition of the present disclosure, applied to a tread of a tire, increases a ground contact area of the tread and improves on-ice performance of the tire.

Yet further, the rubber composition of the present disclosure preferably does not have fillers blended therein which would function as starting points of breakage, whereby deterioration of wear resistance of a tire can be well suppressed.

The rubber composition of the present disclosure contains at least three types of diene polymers forming a plurality of polymer phases which are immiscible with each other. The diene polymers forming the polymer phases exhibit rubber elasticity at the room temperature (25° C.) in the present disclosure.

Examples of the diene polymers include natural rubber (NR) and synthetic diene rubber. Specific examples of the synthetic diene rubber include polybutadiene rubber (BR), synthetic polyisoprene rubber (IR), styrene-butadiene copolymer rubber (SBR), styrene-isoprene copolymer rubber (SIR), and the like. Specific examples of combination of the diene polymers forming a plurality of polymer phases which are immiscible with each other include polybutadiene rubber (BR)/natural rubber (NR) and styrene-butadiene copolymer rubber (SBR), polybutadiene rubber (BR)/synthetic polyisoprene rubber (IR) and styrene-butadiene copolymer rubber (SBR), and the like. Polybutadiene rubber (BR)/natural rubber (NR) and styrene-butadiene copolymer rubber (SBR) is preferable among these examples.

Content of the diene polymer (A) having the lowest glass transition temperature (Tg) among the diene polymers each having content of ≥10% by mass with respect to the total mass of the diene polymers is ≥85% by mass with respect to the content of the diene polymer having the highest content among the diene polymers other than the diene polymer (A) in the rubber composition of the present disclosure. When the content of the diene polymer (A) is less than 10% by mass with respect to the total mass of the diene polymers, the diene polymer (A) cannot influence the performances of the rubber composition in a satisfactory manner. In the rubber composition of the present disclosure, when the content of the diene polymer (A) is ≥85% by mass with respect to the content of the diene polymer having the highest content among the diene polymers other than the diene polymer (A), a polymer phase formed by the diene polymer (A) can have a satisfactory influence on the performances of the rubber composition.

It is preferable that the diene polymer (A) having the lowest glass transition temperature (Tg) has been modified by a compound containing at least one of tin atom (Sn) and nitrogen atom (N). It is further preferable in this regard that a modification rate at which the diene polymer (A) having the lowest glass transition temperature (Tg) has been modified by the compound containing at least one of tin atom and nitrogen atom is in the range of ≥1.1 and ≤2.5, The "modification rate" represents milimoles of the compound containing at least one of tin atom and nitrogen atom, used in a modification reaction, per 100 g of a rubber component of the diene polymer (A), as described above.

In a case where the rubber composition of the present disclosure contains carbon black, modifying the diene polymer (A) by a compound containing at least one of tin atom and nitrogen atom enhances interaction between the diene polymer (A) and the carbon black such that a relatively large proportion of carbon black is distributed to a polymer phase including the diene polymer (A), thereby improving wear resistance of the rubber composition.

Further, in the case where the rubber composition of the present disclosure contains carbon black, modifying the diene polymer (A) by a compound containing at least one of tin atom and nitrogen atom at a modification rate of ≥1.1 further enhances interaction between the diene polymer (A) and the carbon black such that a further larger proportion of carbon black is distributed to a polymer phase including the diene polymer (A), thereby further improving wear resistance of the rubber composition. Viscosity of the rubber composition in an unvulcanized state is relatively low and thus workability of the rubber composition is good when the modification rate is ≤2.5.

Examples of the diene polymer (A) having the lowest glass transition temperature (Tg) (which diene polymer (A) will occasionally be referred to as the "low Tg diene polymer (A)" hereinafter), which may be used, include: a conjugated diene compound as monomer; polymer/copolymer of conjugated diene compound(s) or copolymer of a diene compound and an aromatic vinyl compound, obtained by using the conjugated diene compound and optionally the aromatic vinyl compound; and those obtained by modifying molecular terminals and/or main chains of these (co)polymers. Specific examples of the known modified diene polymer having a modified molecular terminal include the modified diene polymers disclosed in WO 2003/046020 A, JP 2004-513987 A, JP H11-29603 A. JP 2003-113202 A, and JP H06-029338 B. Specific examples of the known modified diene polymer having a modified molecular main chain include the modified diene polymers disclosed in JP 2003-534426 A and JP 2002-201310 A.

In respect of the monomer for use in synthesis of the low Tg diene polymer (A), examples of the conjugated diene compound include 1,3-butadiene, isoprene, 1,3-pentadiene, 2,3-dimethylbutadiene, 2-phenyl-1,3-butadiene, 1,3-hexadiene, and the like and examples of the aromatic vinyl compound include styrene, α-methylstyrene, 1-vinylnaphthalene, 3-vinyltoluene, ethylvinylbenzene, divinylbenzene, 4-cyclohexylstyrene, 2,4,6-trimethylstyrene, and the like.

The low Tg diene polymer (A) having a modified molecular terminal can be manufactured, for example, by subjecting the aforementioned polymers to living polymerization using a polymerization initiator containing tin atom and/or nitrogen atom and then modifying the active polymerization terminal by a modifying agent containing tin atom and/or nitrogen atom. The living polymerization is preferably anionic polymerization.

In a case where (co)polymer having an active terminal is manufactured by anionic polymerization, a lithium amide compound is preferable as the polymerization initiator. Example of the lithium amide compound include lithium hexamethyleneimide, lithium pyrrolidide, lithium piperidide, lithium heptamethyleneimide, lithium dodecamethyleneimide, lithium dimethylamide, lithium diethylamide, lithium dipropylamide, lithium dibutylamide, lithium dihexylamide, lithium diheptylamide, lithium dioctylamide, lithium bis(2-ethtylhexyl)amide, lithium didecyl amide, lithium N-methylpiperazide, lithium ethylpropylamide, lithium ethylbutylamide, lithium methylbutylamide, lithium ethylbenzyiamide, lithium methylphenetylamide, and the like.

Use of a lithium amide compound represented by formula: Li-AM (in the formula, "AM" represents a substituted amino group represented by formula (I) or a cyclic amino group represented by formula (II) shown below) as the aforementioned lithium amide compound makes it possible to obtain the low Tg diene polymer (A) having at least one nitrogen-containing functional group introduced thereto, the at least one nitrogen-containing functional group being selected from the group consisting of a substituted amino group represented by the formula (I) and a cyclic amino group represented by the formula (II).

(In formula (I), $R^1$s each independently represent $C_{1-12}$ alkyl group, cycloalkyl group or aralkyl group.)

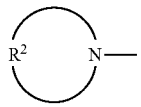

(In formula (II), $R^2$ represents alkylene, substituted alkylene, oxyalkylene or N-alkylamino-alkylene group having a $C_{3-16}$ methylene group.)

In the formula (I), $R^1$s each independently represent $C_{1-12}$ alkyl group, cycloalkyl group or aralkyl group. Specifically, preferable examples of $R^1$ include methyl, ethyl, butyl, octyl, cyclohexyl, 3-phenyl-1-propyl, isobutyl group, and the like. $R^1$s may be of either the same type or different types, respectively.

Further, in the formula (II), $R^2$ represents alkylene, substituted alkylene, oxyalkylene or N-alkylamino-alkylene group having a $C_{3-16}$ methylene group. The substituted alkylene group may be any of mono- to octa-substituted alkylene groups and examples of the substitute group thereof include $C_{1-12}$ linear or branched alkyl, cycloalkyl, bicycloalkyl, aryl, and aralkyl groups. Specific examples of $R^2$ include trimethylene, tetramethylene, hexamethylene, oxydiethylene, N-alkylazadiethylene, dodecamethylene, hexadecamethylene groups, and the like.

The aforementioned lithium amide compound may be either preliminary prepared from a secondary amine and a lithium compound and then used in a polymerization reaction or generated in a polymerization system.

Examples of the secondary amine include dimethylamine, diethylamine, dibutylamine, dioctylamine, dicylohexylamine, diisobutylamine, and cyclic amines such as azacyclohepatane (i,e, hexamethyleneimine), 2-(2-ethylhexyl)pyrrolidine, 3-(2-propyl)pyrrolidine, 3,5-bis(2-ethylhexyl) piperidine, 4-phenylpiperidine, 7-decyl-1-azacyclotridecane, 3,3-dimethyl-1-aza-cyclotetradecane, 4-dodecyl-1-aza-cyclooctane, 4-(2-phenylbutyl)-1-aza-cyclooctane, 3-ethyl-5-cyclohexyl-1-aza-cycloheptane, 4-hexyl-1-aza-cycloheptane, 9-isoamyl-1-aza-cycloheptadecane, 2-methyl-1-aza-cycloheptadece-9-en, 3-isobutyl-1-aza-cyclododecane, 2-methyl-7-tert-butyl-1-aza-cyclododecane, 5-nonyl-1-aza-cyclododecane, 8-(4'-methylphenyl)-5-pentyl-3-aza-bicyclo[5.4.0]undecane, 1-butyl-6-aza-bicyclo [3.2.1]octane, 8-ethyl-3-aza-bicyclo[3.2.1]octane, 1-propyl-3-aza-bicyclo[3.2.2]nonane, 3-(t-butyl)-7-aza-bicyclo [4.3.0]nonane, 1,5,5-trimethyl-3-aza-bicyclo[4.4.0]decane, and the like.

Examples of the lithium compound include hydrocarbyllithium such as ethyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenyl-butyllithium, cyclohexyllithium, cyclopentyllithium, a product obtained by a reaction of diisopropenyl benzene and butyllithium, and the like.

When an active terminal of the aforementioned (co) polymer having an active terminal is modified by a modification agent, a modification agent containing at least one of tin atom and nitrogen atom can be used as the modification agent.

The modification agent containing tin atom (i.e. a tin-containing compound) is preferably a tin-containing coupling agent represented by formula (III) shown below.

(In formula (III), $R^3$s is each independently selected from the group consisting of $C_{1-20}$ alkyl group, $C_{3-20}$ cycloalkyl group, $C_{6-20}$ aryl group, and $C_{7-20}$ aralkyl group; Xs each independently represent chlorine or bromine; and "a" is in the range of 0 to 3, "b" is in the range of 1 to 4, and a+b=4.)

The low Tg diene polymer (A) modified by the tin-containing coupling agent of the formula (III) has at least one type of tin-carbon bond.

Specific examples of $R^3$ include methyl, ethyl, n-butyl, neophyl, cyclohexyl, 2-ethylhexyl, and the like. The coupling agent represented by the formula (III) is preferably tin tetrachloride, $R^3SnCl_3$, $R^3_2SnCl_2$, $R^3_3SnCl$, and the like and most preferably tin tetrachloride.

The modification agent containing nitrogen atom (i.e. a nitrogen-containing compound) is preferably a nitrogen-containing compound having substituted/unsubstituted amino group, amide group, imino group, imidazole group, nitril group, pyridyl group, or the like. Specific examples of the nitrogen-containing compound include N,N'-dimethylimidazolidinone (1,3-dimethyl-2-imidazolidinone), N-methylpyrrolidone, 4-dimethylaminobenzilidene aniline, 4,4'-bis(N,N-dimethylamino)benzophenone, 4,4'-bis(N,N-diethylamino)benzophenone, 4-(N,N-dimethylamino)benzophenone, 4-(N,N-diethylamino)benzophenone, [4-(N,N-dimethylamino)phenyl]methylethylketone, 4,4'-bis(1-hexamethyleneiminomethyl)benzophenone, 4,4'-bis(1- pyrrolidinomethyl)benzophenone, 4-(1-hexamethyleneiminomethyl)benzophenone, 4-(1-pyrrolidinomethyl)benzophenone, [4-(1-hexamethyleneimino)phenyl]methylethylketone, and the like.

The modification agent containing nitrogen atom may further contain chlorosulphenyl group or chlorosulphonyl group. Examples of the modification agent containing chlorosulphenyl group or chlorosulphonyl group, as well as nitrogen, include 2,4-dinitrobenzenesulphenyl chloride, 4-nitrobenzenesulphenyl chloride, 4-nitrobenzenesulphonyl chloride, 2-acetamidebenzenesulphonyl chloride, 1-aminonaphthyl-5-sulphonyl chloride, quinolinesulphonyl chloride, dimethylsulfamoyl chloride, dimethylsulfonyl chloride, 2,4-dinitrobenzenelsulfonyl chloride, and the like, as disclosed in JP H11-29603 A.

Prior to the modification by the modification agent containing nitrogen atom, the aforementioned (co)polymer having an active terminal may be reacted with a 1,1-diphenylethylene compound having a polar group disclosed in JP 2003-113202 A. Specifically, 1-(4-N,N-dimethylaminophenyl)-1-phenyl ethylene or the like can be used as the 1,1-diphenylethylene compound.

The low Tg diene polymer (A) having a modified main chain can be manufactured, for example, by: (1) a method for graft-polymerizing a polar group-containing monomer on (co)polymer of the aforementioned monomer; (2) a method for copolymerizing the aforementioned monomer and a polar group-containing monomer; and (3) a method for adding a polar group-containing compound to (co)polymer of the aforementioned monomer. The copolymerization by using a polar group-containing monomer may be carried out by any of emulsion polymerization, living anionic polymerization and living radical polymerization. Copolymer of the aforementioned monomer and a polar group-containing monomer may be obtained by block polymerization of a polar group-containing monomer and a monomer selected from a conjugated diene compound and an aromatic vinyl compound.

In (1) the method for graft-polymerizing a polar group-containing monomer on (co)polymer of a conjugated diene compound and an aromatic vinyl compound and (2) the method for copolymerizing a conjugated diene compound, an aromatic vinyl compound or the like with a polar group-containing monomer described above, the polar group-containing monomer for use is preferably a vinyl monomer having a polar group. In (3) the method for adding a polar group-containing compound to (co)polymer of a conjugated diene compound, an aromatic vinyl compound or the like, the polar group-containing compound for use is preferably a mercapto compound having a polar group. Specific examples of the polar group include: nitrogen-containing group such as amino, imino, nitrile, ammonium, imido, amido, hydrazo, azo, diazo, nitrogen-containing heterocyclic groups; tin-containing group; and the like.

Specific examples of the vinyl monomer having a polar group include N,N-dimethylaminoethyl(meth)acrylate ("(meth)acrylate" represents "acrylate and/or methacrylate" in the present disclosure), N,N-diethylaminoethyl(meth)acrylate, N,N-dipropylaminoethyl(meth)acrylate, N,N-dioctylaminoethyl(meth)acrylate, N-methyl-N-ethylaminoethyl (meth)acrylate, N,N-dimethylaminopropyl(meth)acrylamide ("(meth)acrylamide" represents "acrylamide and/or methacrylamide" in the present disclosure), N,N-diethylaminopropyl(meth)acrylamide, N,N-2-vinylpyridine, 4-vinylpyridine, allyltri-n-butyltin, allyltrimethyltin, allyltriphenyltin, allyltri-n-octyltin, (meth)acryloxy-n-butyltin ("(meth)acryloxy" represents "acryloxy and/or methacryloxy" in the present disclosure), (meth)acryloxytrimethyltin, (meth)acryloxytriphenyltin, (meth)acryloxy-n-octyltin, vinyltri-n-butyltin, vinyltrimethyltin, vinyltriphenyltin, vinyltri-n-octyltin, and the like. These monomers may be used by either a single type solely or two or more types in combination.

Specific examples of the mercapto compound having a polar group include 2-mercaptoethyl amine, N—N-dimethylaminoethanethiol, 2-mercaptopyridine, 4-mercaptopyridine, 2-mercaptoethyltri-n-butyltin, 2-mercaptoethyltrimethyltin, 2-mercaptoethyltriphenyltin, 3-mercaptopropyltri-n-butyltin, 3-mercaptopropyltrimethyltin, 3-mercaptopropyltriphenyltin, and the like. These monomers may be used by either a single type solely or two or more types in combination.

It is further preferable that the low Tg diene polymer (A) contains both tin atom and nitrogen atom. A modified diene polymer containing both tin atom and nitrogen atom can be obtained, for example, by: using the aforementioned lithium amide compound as a polymerization initiator to introduce a nitrogen-containing functional group into a polymerization initiating terminal and also using the aforementioned tin-containing coupling agent as a modification agent to introduce a tin-containing functional group into a polymerization active terminal (a polymerization terminating terminal); or graft-polymerizing a nitrogen-containing monomer and a tin-containing monomer; or adding a nitrogen-containing compound and a tin-containing compound to a diene polymer.

In a case where the rubber composition of the present disclosure contains carbon black, making the low Tg diene polymer (A) contain both tin atom and nitrogen atom further enhances interaction between the low Tg diene polymer (A) and the carbon black such that a further larger proportion of carbon black is distributed to a polymer phase formed by the low Tg diene polymer (A), thereby further improving an effect of reinforcing the polymer phase and thus significantly enhancing wear resistance of the rubber composition.

In the rubber composition of the present disclosure, the diene polymer (A) having the lowest glass transition temperature (Tg) preferably has a butadiene skeleton. When the low Tg diene polymer (A) has a butadiene skeleton, the rubber composition is made relatively soft, thereby increasing a ground-contact area and improving on-ice performance of a tire when the rubber composition is used in a tread of the tire. It is particularly preferable that the low Tg diene polymer (A) is polybutadiene (BR) in terms of the on-ice performance of the tire.

Content of the diene polymer (A) having the lowest glass transition temperature (Tg) is not particularly restricted as long as it is ≥85% by mass with respect to the content of the diene polymer having the highest content among the diene polymers other than the diene polymer (A), as described above. However, the content of the low Tg diene polymer (A) is preferably ≥40% by mass, more preferably ≥45% by mass, and further more preferably ≥50% by mass, and preferably ≤65% by mass, more preferably ≤60% by mass, and further more preferably ≤55% by mass, with respect to the total mass of the diene polymers. Setting the content of the diene polymer (A) having the lowest glass transition temperature (Tg) to be within the aforementioned range significantly improves on-ice performance of a tire.

In the rubber composition of the present disclosure, among the diene polymers each having content of ≤10% by mass with respect to the total mass of the diene polymers, the diene polymer (C) has the highest glass transition temperature (Tg) and a diene polymer (B), which is other than the diene polymer (A) having the lowest glass transition temperature (Tg) and has glass transition temperature (Tg) lower than that of the diene polymer (C) having the highest glass transition temperature (Tg), has been modified by a compound containing silicon atom. Further, the diene polymer (B) is a copolymer of a conjugated diene compound and styrene and satisfies formula (i) shown below.

$$St+Vi2 \le 33 \qquad (i)$$

In the formula, "St" represents content of bonded styrene (mass %) of the diene polymer (B) and "Vi" represents vinyl bond content (mass %) of the conjugated diene compound part of the diene polymer (B). "St+Vi/2≤30" is preferable in this regard.

The diene polymer (B), which has been modified by a compound containing silicon atom, exhibits strong interaction with silica.

A difference in the glass transition temperature (Tg) between the diene polymer (B) satisfying the relationship of the formula (i) and the diene polymer (C) having the highest glass transition temperature (Tg) is small. Accordingly, the diene polymer (B) has relatively high compatibility with the diene polymer (C) having the highest glass transition temperature (Tg) and thus is included in the polymer phase including the diene polymer (C).

The diene polymer (B) (which will occasionally be referred to as the "high Tg modified diene polymer (B)" hereinafter), which can be used, is manufactured by preparing copolymer of a conjugated diene compound and styrene as monomers and modifying a molecular terminal (a polymerization active terminal) of the copolymer, i.e. the styrene-conjugated diene compound copolymer. Examples of the conjugatged diene compound include 1,3-butadiene, isoprene, 1,3-pentadiene, 2,3-dimethylbutadiene, 2-phenyl-1,3-butadiene, 1,3-hexadiene, and the like.

In a case where a polymerization active terminal of the styrene-conjugated diene compound copolymer is reacted with a compound containing silicon atom, e.g. a hydrocarbyloxysilane compound (a hydrocarbyloxysilane compound containing nitrogen atom in particular) for modification, it is preferable that at least 10% of polymer chains of the styrene-conjugated diene compound copolymer has living characteristics or pseudo-living characteristics. Preferable examples of a polymerization reaction for obtaining a styrene-conjugated diene compound copolymer having such living characteristics include anionically polymerizing styrene and a conjugated diene compound in an organic solvent with an organic alkali metal compound as a polymerization initiator. The glass transition temperature (Tg) of the styrene-conjugated diene compound copolymer can be adjusted at the desired temperature by the anionic polymerization in this case.

An organic lithium compound is preferable as the organic alkali metal compound used as an initiator of the anionic polymerization. Types of the organic lithium compound is not particularly restricted but hydrocarbyllithium or a lithium amide compound is preferably used. In a case where hydrocarbyllithium is used as the organic lithium compound, a styrene-conjugated diene compound copolymer with one end as a polymerization initiating terminal having hydrocarbyl group thereat and the other end as a polymerization active terminal is obtained. The polymerization active terminal as a polymerization active site of the styrene-conjugated diene compound copolymer is then reacted with a compound containing silicon atom for modification of the copolymer.

In a case where a lithium amide compound is used as the organic lithium compound, a styrene-conjugated diene compound copolymer with one end as a polymerization initiating terminal having a nitrogen-containing group thereat and the other end as a polymerization active terminal which is a polymerization active site is obtained. The polymerization active terminal as a polymerization active site of the styrene-conjugated diene compound copolymer is then reacted with a compound containing silicon atom for modification of the copolymer, whereby what is called a "both-terminal-modified" styrene-conjugated diene compound copolymer is obtained.

Hydrocarbyllithium having $C_{2-20}$ hydrocarbyl group is preferable for hydrocarbyllithium as a polymerization initiator and specific examples thereof include ethyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenylbutyllithium, cyclohexyllithium, cyclopentyllithium, a product of a reaction between diisopropenyl benzene and butyllithium, and the like N-butyllithium is particularly preferable among these examples.

Examples of the lithium amide compound as a polymerization initiator include lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, lithium methylphenethylamide, and the like. A cyclic lithium amide such as lithium hexamethyleneimide, lithium pyrrolidide, lithium piperidide, lithium heptamethyleneimide, lithium dodecamethyleneimide are preferable, and lithium hexamethyleneimide and lithium pyrrolidide are particularly preferable among these examples. The aforementioned lithium amide compound may be either preliminary prepared from a secondary amine and a lithium compound and then used for a polymerization reaction or prepared in a polymerization system (i.e. in-situ).

The aforementioned polymerization initiator is used preferably by an amount of 0.2-20 mmol/100 g of the monomers.

A method for manufacturing a styrene-conjugated diene compound copolymer by anionic polymerization using the aforementioned organic lithium compound as a polymerization initiator is not particularly restricted and a known, conventional method can be used.

Specifically, a styrene-conjugated diene compound copolymer having a polymerization active terminal as desired can be obtained by anionically polymerizing a conjugated diene compound and styrene by using the aforementioned organic lithium compound as a polymerization initiator in the presence of a randomizer in an organic solvent non-reactive to the reaction, e.g. a hydrocarbon solvent based on aliphatic, cycloaliphatic, aromatic hydrocarbon compound.

The hydrocarbon solvent is preferably a $C_{3-8}$ solvent and examples thereof include propane, n-butane, isobutene, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene, and the like. These hydrocarbon solvents may be used by either a single type solely or two or more types in combination.

Concentration of the monomers in the solvent is preferably 5-50 mass % and more preferably 10-30 mass %. In a case where a conjugated diene compound and styrene are copolymerized, concentration of styrene in a mixture in which the monomers have been charged is preferably 5-30 mass % and more preferably 6-25 mass %.

A "randomizer", which may be optionally used, is a compound causing an effect of controlling a micro structure of a styrene-conjugated diene compound copolymer, e.g. increasing vinyl bond content of a conjugated diene compound part of the styrene-conjugated diene compound copolymer, or an effect of controlling compositional distribution of the monomer units in the styrene-conjugated diene compound copolymer, e.g. randomizing the conjugated diene compound unit and the styrene unit in the styrene-conjugated diene compound copolymer.

Any known compound generally used as a conventional randomizer may be appropriately selected and used as the aforementioned randomizer. Specific examples of the randomizer include ethers and tertiary amines such as dimethoxybenzene, tetrahydrofuran, dimethoxyethane, diethyleneglycol dibutyl ether, diethyleneglycol dimethyl ether, 2,2-bis(2-tetrahydrofuryl)propane, triethylamine, pyridine, N-methylmorpholine, N,N,N',N'-tetramethylethylenediamine, 1,2-dipiperidinoethane, and the like. Examples of the randomizer also include a potassium salt such as potassium t-amylate, potassium t-butoxide and a sodium salt such as sodium t-amylate.

These randomizers may be used by either a single type solely or two or more types in combination. An amount of the randomizer to be used is selected within the range of preferably 0.01-1000 mole chemically equivalent to 1 mole of the polymerization initiator.

The temperature at the polymerization reaction of the conjugated diene compound and styrene is set preferably in the range of 0-150° C. and more preferably in the range of 20-130° C. The polymerization reaction may be carried out under generated pressure. However, normally it is preferable that the operation is carried out under pressure which is high enough to keep the monomers substantially in a liquid phase. That is, high pressure may optionally be applied, depending on the respective substances to be polymerized, the polymerization solvent in use and the polymerization temperature. Such high pressure can be obtained by an appropriate method such as pressurizing a reaction vessel with gas inactive to the polymerization reaction.

A hydrocarbyloxysilane compound is preferable and a hydrocarbyloxysilane compound containing nitrogen atom is more preferable as a compound containing silicon atom for use as a modification agent for obtaining the high Tg modified diene polymer (B).

Examples of the hydrocarbyloxysilane compound containing nitrogen atom include N,N-bis(trimethylsilyl)aminopropylmethyldimethoxysilane, N,N-bis(trimethylsilyl)aminopropylmethyldiethoxysilane, N,N-bis(trimethylsilyl)aminoethylmethyldimethoxysilane, N,N-bis(trimethylsilyl)aminoethylmethyldiethoxysilane, 1-trimethylsilyl-2,2-diethoxymethyl-1-aza-2-silacyclopentane, N-(1,3-dimethylbutylidene)-3-(triethoxysilyl)-1-propaneamine, N-{3-(triethoxysilyl)propyl}-4,5-dihydroimidazole, N,N-bis(trimethylsilyl)aminopropyltriethoxysilane, dimethylaminopropyltriethoxysilane, and the like. N,N-bis(trimethylsilyl)aminopropylmethyldimethoxysilane is particularly preferable among these examples.

Examples of the hydrocarbyloxysilane compound not containing nitrogen atom include tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, dimethyldimethoxysilane, methylphenyldimethoxysilane, vinyltrimethoxysilane, vinyltriethoxysilane, divinyldimethoxysilane, divinyldiethoxysilane, and the like. Tetraethoxysilane is preferable among these examples.

These compounds containing silicon atom may be used by either a single type solely or two or more types in combination.

The aforementioned compound containing silicon atom may be a partial condensation product. A "partial condensation product" represents a product obtained when not all but only a part of SiOR of each compound containing silicon atom has collectively formed SiOSi bonding as a result of condensation.

The aforementioned compound containing silicon atom is used preferably by an amount of 0.5-200 mmol/kg·styrene-conjugated diene compound copolymer, more preferably by an amount of 1-100 mmol/kg·styrene-conjugated diene compound copolymer, and most preferably by an amount of 2-50 mmol/kg·styrene-conjugated diene compound copolymer. In this regard, the mass of the styrene-conjugated diene compound copolymer in the denominator represents a mass of the polymers exclusively, which mass does not include the mass of additives such as anti-oxidant added during or after manufacturing a tire. It is possible to improve dispersion properties of silica by setting an amount of the compound containing silicon atom to be used within the aforementioned range. Use of the rubber composition thus obtained in a tire further improves on-ice performance and wear resistance of the tire.

A method for adding the compound containing silicon atom is not particularly restricted and examples thereof include adding it at a time, adding it in several steps, adding it continuously, and the like. Adding the compound containing silicon atom at a time is preferable among these examples.

The residue of the compound containing silicon atom may be bonded to any of a polymerization initiating terminal, a polymerization terminating terminal, the polymer main chain, and a side chain of the polymer. However, it is preferable that the residue of the compound containing silicon atom is introduced to a polymerization initiating terminal or a polymerization terminating terminal.

A condensation facilitating agent is preferably used in order to facilitate a reaction which the compound containing silicon atom is involved with. Examples of the condensation facilitating agent which can be used include: a compound containing a tertiary amino group; and an organic compound containing at least one type of elements selected from group 3, group 4, group 5, group 12, group 13, group 14, and group 15 of the periodic table (the long-periodic table). Specifically, preferable examples of the condensation facilitating agent include alkoxide, carboxylate salt and acetylacetonate complex salt, containing at least one type of metal selected from the group consisting of titanium (Ti), zirconium (Zr), bismuth (Bi), aluminum (Al) and tin (Sn).

A titanium-based condensation facilitating agent such as tetrakis(2-ethyl-1,3-hexanediolato)-titanium, tetrakis(2-ethylhexoxy)-titanium, titanium di-n-butoxide (bis-2,4-pentadionate), and the like, is particularly preferable among the aforementioned examples of the condensation facilitating agent.

The condensation facilitating agent is added to a modification reaction system preferably during a modification reaction and/or completion of the modification reaction. If the condensation facilitating agent were to be added to a modification reaction system before the modification reaction, the condensation facilitating agent would be directly reacted with an active terminal, whereby hydrocarbyloxy group having a protected primary amino group might not be introduced to the active terminal.

In a case where the condensation facilitating agent is added to a modification reaction system during a modification reaction, the condensation facilitating agent is added to the modification reaction system preferably 5 minutes to 5 hours after the start of the modification reaction and more preferably 15 minutes to 1 hour after the start of the modification reaction.

In the rubber composition of the present disclosure, the diene polymer (B) having glass transition temperature (Tg) which is neither the lowest nor the highest among the diene polymers each having content of ≥10% by mass with respect to the total mass of the diene polymers has been modified by a compound containing silicon atom. In contrast, in respect of the diene polymers other than the diene polymer (B), they may be either modified or not modified. However, it is preferable that the diene polymer (A) having the lowest glass transition temperature (Tg) has been modified by a compound containing tin atom and/or nitrogen atom, as described above.

In the rubber composition of the present disclosure, the diene polymer (B) preferably has a styrene skeleton and a butadiene skeleton. When the high Tg modified diene polymer (B) has a styrene skeleton and a butadiene skeleton, the diene polymer (B) exhibits satisfactory compatibility with the diene polymer (C) having the highest glass transition temperature (Tg).

Examples of the diene polymer having a styrene skeleton and a butadiene skeleton include styrene-butadiene copolymer rubber (SBR), styrene-isoprene copolymer rubber (SIR), styrene-isoprene-butadiene terpolymer, and the like. It is particularly preferable that the high Tg modified diene polymer (B) is styrene-butadiene copolymer (SBR) in terms of compatibility with the diene polymer (C) having the highest glass transition temperature (Tg).

The diene polymer (B) is modified by a compound containing silicon atom (Si) preferably at a modification rate in the range of ≥0.1 and ≤2.5. Modifying the diene polymer (B) by a compound containing silicon atom at a modification rate of ≥0.1 enhances interaction between the diene polymer (B) and silica, whereby a relatively large proportion of silica is distributed to the polymer phase including the diene polymer (B). The modification rate ≤2.5 in this regard decreases viscosity of the rubber composition in an unvulcanized state and thus ensures satisfactory workability of the rubber composition.

In the present disclosure, a "modification rate" of the diene polymer (B) represents milimoles of the compound containing silicon atom, used in a modification reaction, per 100 g of a rubber component of the diene polymer (B).

Content of the diene polymer (B) is ≥10 mass %, preferably ≥15 mass %, with respect to the total mass of the diene polymers. Further, the content of the diene polymer (B) is preferably ≤35 mass %, more preferably ≤25 mass %, further more preferably ≤20 mass %, with respect to the total mass of the diene polymers. Setting the content of the diene polymer (B) within the aforementioned ranges further improves on-ice performance of a tire.

In the rubber composition of the present disclosure, the diene polymer (C) having the highest glass transition temperature (Tg) among the diene polymers each having content of ≥10% by mass with respect to the total mass of the diene polymers (which diene polymer (C) will occasionally be referred to as the "high Tg diene polymer (C)" hereinafter) preferably has an isoprene skeleton. When the high Tg diene polymer (C) has an isoprene skeleton, reinforcing properties of the rubber composition and wear resistance of a tire improve. Examples of the diene polymer having an isoprene skeleton include natural rubber (NR), synthetic polyisoprene rubber (IR), and the like. It is particularly preferable that the high Tg diene polymer (C) is natural rubber (NR) in terms of wear resistance.

It is preferable that content of the diene polymer (C) having the highest glass transition temperature (Tg) is smaller than or equal to the content of the low Tg diene polymer (A) described above. The content of the diene polymer (C) is more preferably ≥25 mass %, further more preferably ≥30 mass %, most preferably ≥35 mass %, with respect to the total mass of the diene polymers. Further, the content of the diene polymer (C) is more preferably ≤45 mass %, further more preferably ≤40 mass %, with respect to the total mass of the diene polymers. Setting the content of the diene polymer (C) having the highest glass transition temperature (Tg) within the aforementioned ranges significantly improves on-ice performance of a tire, while maintaining satisfactorily high wear resistance of the tire.

The rubber composition of the present disclosure may further include another diene polymer (D), as well as the diene polymer (A) having the lowest glass transition temperature (Tg), the diene polymer (B) having glass transition temperature (Tg) which is neither the lowest nor the highest, and the diene polymer (C) having the highest glass transition temperature (Tg) described above.

The rubber composition of the present disclosure contains silica. In the rubber composition of the present disclosure, a relatively large proportion of said silica is distributed to the polymer phase including the high Tg modified diene polymer (B). As a result, the polymer phase is made soft and provided with minute irregularities, thereby improving on-ice performance of a tire.

Type of the silica is not particularly restricted and examples thereof include wet-type silica (hydrated silica), dry-type silica (silicic anhydride), calcium silicate, aluminum silicate, and the like. Wet-type silica is preferable among these examples. These silicas may be used by either a single type solely or two or more types in combination.

Content of the silica is parts by mass, preferably ≥27 parts by mass, more preferably ≥29 parts by mass, with respect to the total, i.e. 100 parts by mass, of the diene polymers. Further, the content of the silica is preferably ≤50 parts by mass, more preferably ≤45 parts by mass, with respect to the total, i.e. 100 parts by mass, of the diene polymers. Setting the content of the silica to be ≥25 parts by mass with respect to the total or 100 parts by mass of the diene polymers makes the polymer phase including the high Tg modified diene polymer (B) satisfactorily hard, while providing the polymer phase with minute irregularities and improving on-ice performance of a tire. Setting the content of the silica to be ≤50 parts by mass with respect to the total or 100 parts by mass of the diene polymers ensures good workability of the rubber composition.

It is preferable that the rubber composition of the present disclosure further contains carbon black. When the rubber composition of the present disclosure contains carbon black, since a relatively large proportion of silica is distributed to the polymer phase including the high Tg modified diene polymer (B) as described above, a relatively large proportion of carbon black is distributed to the polymer phase formed by the low Tg diene polymer (A). As a result, the polymer phase formed by the low Tg diene polymer (A), containing the large proportion of carbon black having excellent reinforcing properties, is reinforced, whereby wear resistance of a tire improves.

Type of the carbon black is not particularly restricted and examples thereof include carbon blacks of GPF FEF, HAF, ISAF, SAF grades. These carbon blacks may be used by either a single type solely or two or more types in combination.

Content of the carbon black is preferably ≥25 parts by mass, more preferably ≥27 parts by mass, further more preferably ≥29 parts by mass, with respect to the total, i.e. 100 parts by mass, of the diene polymers. Further, the content of the carbon black is preferably ≤50 parts by mass, more preferably ≤40 parts by mass, with respect to the total, i.e. 100 parts by mass, of the diene polymers. Setting the content of the carbon black to be ≥25 parts by mass with respect to the total or 100 parts by mass of the diene polymers successfully reinforces the polymer phase formed by the low Tg diene polymer (A), thereby improving wear resistance of a tire. Setting the content of the carbon black to be ≤50 parts by mass with respect to the total or 100 parts by mass of the diene polymers ensures good workability of the rubber composition.

It is preferable that the rubber composition of the present disclosure further contains a foaming agent. In a case where the rubber composition contains a foaming agent, when vulcanized rubber is produced by vulcanization of the rubber composition, gas bubbles derived from the foaming agent are generated inside the vulcanized rubber. Accordingly, it is possible, by manufacturing a tire by using in tread thereof the rubber composition containing a foaming agent, to further improve on-ice performance of the tire by a scratching effect and a drainage effect caused by the gas bubbles (-derived holes) in the tread.

Preferable examples of the foaming agent include azodicarbonamide (ADCA), dinitrosopentamethylenetetramine (DNPT), dinitrosopentastyrenetetramine, benzenesulfonyl hydrazide derivative, p,p'-oxybisbenzenesulfonyl hydrazide (OBSH), ammonium bicarbonate, sodium bicarbonate, ammonium carbonate, nitrososulfonyl azo compound, N,N'-dimethyl-N,N'-dinitrosophthalamide, toluenesulfonyl hydrazide, p-toluenesulfonyl semicarbazide, p,p'-oxybis-benzenesulfonyl semicarbazide, and the like. Dinitrosopentamethylenetetramine (DNPT) is preferable among these foaming agents. These foaming agents may be used by either a single type solely or two or more types in combination.

Content of the foaming agent is not particularly restricted but preferably in the range of 0.1 to 30 parts by mass, more preferably in the range of 1 to 20 parts by mass, with respect to the total, i.e. 100 parts by mass, of the diene polymers.

It is preferable to use an auxiliary foaming agent such as urea, zinc stearate, zinc benzenesulfinate, zinc white, together with the aforementioned foaming agent. The aforementioned auxiliary foaming agents may be used by either a single type solely or two or more types in combination. Use of the auxiliary foaming agent together with the foaming agent facilitates a foaming reaction and enhances the degree of completion of the reaction, thereby successfully suppressing unwanted degradation which would otherwise occur over time.

Content of the auxiliary foaming agent is not particularly restricted but preferably in the range of 1 to 30 parts by mass with respect to the total, i.e. 100 parts by mass, of the diene polymers.

A foaming ratio of vulcanized rubber obtained by vulcanizing the rubber composition containing the aforementioned foaming agent is generally in the range of 1 to 50%, preferably in the range of 5 to 40%. In a case where the rubber composition contains a foaming agent, an excessively large foaming ratio results in a large volume of voids at a rubber surface, thereby making it difficult to ensure a satisfactorily large ground contact area of a tire. In this connection, setting a foaming ratio to be within the aforementioned range prevents an amount of gas bubbles from exceeding the adequate level, while successfully generating an enough amount of gas bubble-derived holes effectively functioning as drainage grooves, whereby deterioration in durability of a tire can be avoided, in the present disclosure, a "foaming ratio" of the vulcanized rubber represents the average foaming ratio Vs, which is specifically calculated by formula (ii) shown below.

$$Vs = (\rho_0/\rho_1 - 1) \times 100 (\%) \qquad (ii)$$

In the formula (ii), $\rho_1$ represents density (g/cm$^3$) of vulcanized rubber (foamed rubber) and $\rho_0$ represents density (g/cm$^3$) of a solid phase portion of the vulcanized rubber (the foamed rubber). Density of vulcanized rubber and density of a solid phase portion of the vulcanized rubber are calculated from the mass of a sample measured in ethanol and the mass of the sample measured in ambient air. It is possible to change a foaming ratio in an appropriate manner by adjusting types, amounts or the like of the foaming agent and/or the auxiliary foaming agent.

It is preferable that the rubber composition of the present disclosure further contains a $C_5$ resin. Use of the rubber composition containing a $C_5$ resin in a tire further improves on-ice performance of the tire.

Examples of the $C_5$ resin include an aliphatic petroleum resin prepared by (co)polymerizing $C_5$ fraction obtained from thermal decomposition of naphtha in the petrochemical industry. Examples of the $C_5$ fraction generally include: olefinic hydrocarbons such as 1-pentene, 2-pentene, 2-methyl-1-butene, 2-methyl-2-butene, 3-methyl-1-butene; diolefinic hydrocarbons such as 2-methyl-1,3-butadiene, 1,2-pentadiene, 1,3-pentadiene, 3-methyl-1,2-butadiene; and the like. Commercially available products may be used as the $C_5$ resin.

Content of the $C_5$ resin is not particularly restricted but preferably in the range of 5 to 50 parts by mass, more preferably in the range of 10 to 20 parts by mass, with respect to the total, i.e. 100 parts by mass, of the diene polymers. The content of the $C_5$ resin of ≥5 parts by mass satisfactorily improves on-ice performance of a tire and the content of the $C_5$ resin of ≤50 parts by mass ensures satisfactorily high wear resistance of the tire.

It is preferable that the rubber composition of the present disclosure further contains hydrophilic short fibers. In a case where the rubber composition contains the hydrophilic short fibers and the aforementioned foaming agent, gas generated by the foaming agent in the vulcanization process enters the (hollow) inside of each hydrophilic fiber and forms a gas bubble having a configuration corresponding to the configuration of the hydrophilic fiber. Wall surfaces of the gas bubble(-derived holes) are covered with a resin derived from the hydrophilic short fiber and thus made hydrophilic in this case. Accordingly, in a case where a tire is manufactured by using in tread thereof the rubber composition containing the hydrophilic short fibers and the foaming agent, wall surfaces of gas bubble-derived holes are exposed at the tread surface when the tire is used, which exposure improves an affinity for water and facilitates introduction of water to the gas bubbles-derived holes, thereby imparting the tire with good drainage properties to significantly improve on-ice performance of the tire.

Examples of the hydrophilic resin which can be used as a raw material of the hydrophilic short fibers include ethylene-vinyl alcohol copolymer, vinyl alcohol homopolymer, poly(meth)acrylic acid or ester thereof, polyethylene glycol, carboxyvinyl copolymer, styrene-maleic acid copolymer, polyvinylpyrrolidone, vinylpyrrolidone-vinylacetate copolymer, mercaptoethanol, and the like. Ethylene-vinyl alcohol copolymer, vinyl alcohol homopolymer and poly(meth)acrylic acid are preferable among these examples and ethylene-vinyl alcohol copolymer is particularly preferable.

Outer surface of the hydrophilic short fiber may have a coating layer formed of a low-melting point resin having an affinity for the diene polymer and preferably having low melting point lower than the vulcanization highest temperature of the rubber composition. Formation of such a coating layer as described above, having high affinity for the diene polymer, improves dispersibility of the short fibers into the diene polymer, while high affinity for water, of the inner surface of the hydrophilic short fiber, is effectively retained. Further, the low-melting point resin of the coating layer melts and is made fluid during the vulcanization process, thereby significantly contributing to better adhesion between the diene polymer and the hydrophilic short fiber, so that a tire imparted with good drainage properties and high durability can be easily realized. Thickness of the coating layer, which may vary depending on the content, the average diameter, and the like of the hydrophilic short fibers, is generally in the range of 0.001 to 10 μm and preferably in the range of 0.001 to 5 μm.

The melting point of the low-melting point resin for use in the coating layer is preferably lower than the highest temperature in vulcanization of the rubber composition. The vulcanization highest temperature represents the highest temperature reached by the rubber composition during the vulcanization process of the rubber composition. In a case where the rubber composition is vulcanized in a mold, for example, the vulcanization highest temperature represents the highest temperature reached by the rubber composition in a period, from the entry of the rubber composition into the mold, to the removal of the rubber composition from the mold for cooling. Such vulcanization highest temperature as described above can be measured by, for example, embedding a thermocouple in the rubber composition. The upper limit of the melting point of the low-melting point resin, although it is not particularly restricted, is preferably selected in view of the requirements and conditions described above. In general, the upper limit of the melting point of the low-melting point resin is lower than the vulcanization highest temperature of the rubber composition preferably by at least 10° C. and more preferably by at least 20° C. The industrial vulcanization temperature of a rubber composition is generally around 190° C. at its maximum. When the vulcanization highest temperature is set at e.g. aforementioned 190° C., the melting point of the low-melting point resin is generally set at temperature of ≤190° C., preferably ≤180° C., and more preferably ≤170° C.

A polyolefin resin is preferable as the low-melting point resin and examples of the polyolefin resin include polyethylene, polypropylene, polybutene, polystyrene, ethylene-propylene copolymer, ethylene-methacrylic acid copolymer, ethylene-ethyl acrylate copolymer, ethylene-propylene-diene terpolymer, ethylene-vinyl acetate copolymer, ionomer resins thereof, and the like.

The average length of the hydrophilic short fibers is preferably in the range of 0.1 to 50 mm, more preferably in the range of 1 to 7 mm, and the average diameter of the hydrophilic short fibers is preferably in the range of 1 μm to 2 mm, more preferably in the range of 5 μm to 0.5 mm. Setting the average length and the average diameter of the hydrophilic short fibers to be within the aforementioned ranges prevents the fibers from being entangled more than necessary, thereby ensuring satisfactory dispersion properties thereof.

Content of the hydrophilic short fibers is preferably in the range of 0.1 to 100 parts by mass, more preferably in the range of 1 to 50 parts by mass, with respect to the total, i.e. 100 parts by mass, of the diene polymers. Setting the content of the hydrophilic short fibers to be within the aforementioned ranges makes it possible to achieve satisfactory on-ice performance and satisfactory wear resistance of a tire in a well-balanced manner.

It is acceptable to optionally select additives generally for use in the rubber industries like silane coupling agent, softening agent, stearic acid, anti-oxidant, zinc oxide (zinc white), vulcanization accelerator, vulcanizing agent, and the like, and add them, as well as the aforementioned diene polymer, silica, carbon black, foaming agent, auxiliary foaming agent, $C_5$ resin, hydrophilic short fibers described above, to the rubber composition of the present disclosure unless addition of the optional additives adversely affects the object of the present disclosure. Commercially available products can be suitably used as the optional additives described above. The rubber composition of the present disclosure can be manufactured by blending at least three types of the diene polymers with silica and the respective additives optionally selected according to necessity and then subjecting the blend to mixing and kneading, warming, extrusion, and the like.

<Tire>

A tire of the present disclosure is characterized in that it uses the rubber composition described above. The rubber composition is preferably used in tread of the tire. A tire using the aforementioned rubber composition in tread thereof exhibits good on-ice performance and is useful for a winter tire such as a studless tire.

The tire of the present disclosure may be manufactured by either i) molding the rubber composition in an unvulcanized state and subjecting a resulting green tire to vulcanization or ii) subjecting the rubber composition to a preliminary vulcanization process, molding half-vulcanized rubber thus obtained by the preliminary vulcanization process, and subjecting a resulting tire to a main vulcanization process. Examples of gas with which the is to be inflated include inert gas such as nitrogen, argon, helium or the like, as well as ambient air and air of which partial pressure has been adjusted.

EXAMPLES

The present disclosure will be described further in detail by Examples hereinafter. The present disclosure is not limited by any means to these Examples.

<Preparation of Rubber Composition>

Rubber composition samples are prepared according to the blending prescriptions shown in Tables 1 and 2. The samples are observed by using a scanning probe microscope according to the method described in paragraph [0009] of the present disclosure. A phase-separated structure and formation of a plurality of polymer phases immiscible with each other are confirmed in each of the rubber composition samples.

<Preparation of Tire>

Sample tires (tire size: 195/65R15) for testing are prepared by using in treads thereof the rubber composition samples thus obtained, according to the conventional method. A foaming ratio of the tread is calculated for each of the sample tires according to the formula (ii) described above. Wear resistance and on-ice performance are then evaluated for each of the sample tires by the methods described below.

The results are shown in Tables 1 and 2.

(1) Wear Resistance

Wear resistance of each of the sample tires is evaluated by: driving 10,000 km an actual vehicle mounted with the sample tire on a paved road; measuring remaining depths of grooves; calculating a running distance required for the tread to be worn by 1 mm and converting the running distance to an index value relative to "100" as the corresponding running distance of Comparative Example 2, for comparison. The larger index value represents the better wear resistance.

(2) On-Ice Performance

On-ice performance of each of the sample tires is evaluated by: mounting the sample tire (×4) on each of four wheels of a Japanese vehicle having displacement volume around 1600 cc; measuring a braking distance at ice temperature −1° C. as on-ice braking performance of the sample tire; and expressing "on-ice performance" of the sample tire, as an index value, according to a formula: On-ice performance=(On-ice braking distance of Comparative Example 2/On-ice braking distance of the sample tire)×100. Comparative Example 2 is the control. The larger index value represents the better on-ice performance.

TABLE 1

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
| --- | --- | --- | --- | --- | --- | --- | --- | --- | --- | --- | --- | --- | --- |
| Blend prescription | NR *1 | Parts by mass | 35 | 35 | 35 | 35 | 65 | 35 | 35 | 35 | 35 | 35 | 50 |
|  | Modified SBR1 *2 |  | 0 | 0 | 0 | 0 | 0 | 0 | 0 | 0 | 0 | 15 | 0 |
|  | Modified SBR2 *3 |  | 0 | 0 | 0 | 0 | 0 | 0 | 0 | 0 | 0 | 0 | 15 |
|  | BR *4 |  | 0 | 0 | 65 | 0 | 0 | 0 | 0 | 0 | 0 | 0 | 0 |
|  | Modified BR1 *5 |  | 0 | 0 | 0 | 0 | 0 | 0 | 0 | 0 | 0 | 0 | 0 |
|  | Modified BR2 *6 |  | 65 | 65 | 0 | 65 | 35 | 65 | 65 | 65 | 65 | 50 | 35 |
|  | Carbon black *7 |  | 30 | 30 | 30 | 30 | 30 | 30 | 20 | 30 | 30 | 30 | 30 |
|  | Silica *8 |  | 30 | 0 | 0 | 30 | 30 | 20 | 30 | 30 | 0 | 0 | 0 |
|  | Micro-diameter silica *9 |  | 0 | 30 | 30 | 0 | 0 | 0 | 0 | 0 | 30 | 30 | 30 |
|  | Silane coupling agent *10 |  | 3 | 3 | 3 | 3 | 3 | 3 | 3 | 3 | 3 | 3 | 3 |
|  | Process oil *11 |  | 10 | 10 | 10 | 10 | 10 | 10 | 10 | 10 | 10 | 10 | 10 |
|  | Anti-oxidant IPPD *12 |  | 1.5 | 1.5 | 1.5 | 1.5 | 1.5 | 1.5 | 1.5 | 1.5 | 1.5 | 1.5 | 1.5 |
|  | $C_5$ resin *13 |  | 0 | 0 | 0 | 0 | 0 | 0 | 0 | 0 | 0 | 0 | 0 |
|  | Low molecular weight polybutadiene *14 |  | 0 | 0 | 0 | 10 | 0 | 0 | 0 | 0 | 0 | 0 | 0 |
|  | Foaming agent DNPT *15 |  | 3 | 0 | 0 | 3 | 0 | 0 | 0 | 0 | 3 | 3 | 3 |
|  | Hydrophilic short fibers *16 |  | 0 | 0 | 0 | 0 | 0 | 0 | 0 | 0 | 0 | 0 | 0 |
|  | Vulcanization accelerator MBTS *17 |  | 1 | 1 | 1 | 1 | 1 | 1 | 1 | 1 | 1 | 1 | 1 |
|  | Vulcanization accelerator CBS *18 |  | 0.3 | 0.3 | 0.3 | 0.3 | 0.3 | 0.3 | 0.3 | 0.3 | 0.3 | 0.3 | 0.3 |
|  | Sulfur |  | 2 | 2 | 2 | 2 | 2 | 2 | 2 | 2 | 2 | 2 | 2 |
|  | Zinc oxide |  | 2 | 2 | 2 | 2 | 2 | 2 | 2 | 2 | 2 | 2 | 2 |
| Physical properties | Foaming ratio | % | 20 | 0 | 0 | 20 | 0 | 0 | 0 | 0 | 20 | 20 | 20 |
| Evaluation | Wear resistance | Index | 86 | 100 | 94 | 92 | 100 | 85 | 82 | 82 | 91 | 85 | 92 |
|  | On-ice performance | Index | 119 | 100 | 90 | 113 | 95 | 104 | 103 | 108 | 115 | 112 | 113 |

TABLE 2

|  |  |  | Example 1 | Example 2 | Example 3 | Example 4 | Example 5 | Example 6 | Example 7 | Example 8 | Example 9 | Example 10 | Example 11 |
| --- | --- | --- | --- | --- | --- | --- | --- | --- | --- | --- | --- | --- | --- |
| Blend prescription | NR *1 | Parts by mass | 35 | 35 | 35 | 35 | 35 | 35 | 30 | 25 | 35 | 35 | 35 |
|  | Modified SBR1 *2 |  | 1 | 0 | 0 | 0 | 0 | 0 | 0 | 0 | 0 | 0 | 0 |
|  | Modified SBR2 *3 |  | 15 | 15 | 15 | 15 | 15 | 15 | 10 | 35 | 15 | 15 | 15 |
|  | BR *4 |  | 0 | 0 | 50 | 0 | 0 | 0 | 0 | 0 | 0 | 0 | 0 |
|  | Modified BR1 *5 |  | 0 | 0 | 0 | 0 | 0 | 0 | 0 | 0 | 0 | 0 | 50 |
|  | Modified BR2 *6 |  | 50 | 50 | 0 | 50 | 50 | 50 | 60 | 40 | 50 | 50 | 0 |
|  | Carbon black *7 |  | 30 | 30 | 30 | 30 | 30 | 30 | 30 | 30 | 30 | 40 | 30 |
|  | Silica *8 |  | 0 | 0 | 0 | 0 | 0 | 30 | 0 | 0 | 0 | 0 | 0 |
|  | Micro-diameter silica *9 |  | 30 | 30 | 30 | 30 | 30 | 0 | 30 | 30 | 40 | 30 | 30 |
|  | Silane coupling agent *10 |  | 3 | 3 | 3 | 3 | 3 | 3 | 3 | 3 | 3 | 3 | 3 |

TABLE 2-continued

|  |  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
|  | Process oil *11 |  | 10 | 10 | 10 | 10 | 10 | 10 | 10 | 10 | 10 | 10 | 10 |
|  | Anti-oxidant IPPD *12 |  | 1.5 | 1.5 | 1.5 | 1.5 | 1.5 | 1.5 | 1.5 | 1.5 | 1.5 | 1.5 | 1.5 |
|  | $C_5$ resin *13 |  | 0 | 0 | 0 | 0 | 10 | 0 | 0 | 0 | 0 | 0 | 0 |
|  | Low molecular weight polybutadiene *14 |  | 0 | 0 | 0 | 0 | 0 | 0 | 0 | 0 | 0 | 0 | 0 |
|  | Foaming agent DNPT *15 |  | 3 | 0 | 3 | 3 | 3 | 3 | 3 | 3 | 3 | 3 | 3 |
|  | Hydrophilic short fibers *16 |  | 0 | 0 | 0 | 3 | 3 | 0 | 0 | 0 | 0 | 0 | 0 |
|  | Vulcanization accelerator MBTS *17 |  | 1 | 1 | 1 | 1 | 1 | 1 | 1 | 1 | 1 | 1 | 1 |
|  | Vulcanization accelerator CBS *18 |  | 0.3 | 0.3 | 0.3 | 0.3 | 0.3 | 0.3 | 0.3 | 0.3 | 0.3 | 0.3 | 0.3 |
|  | Sulfur |  | 2 | 2 | 2 | 2 | 2 | 2 | 2 | 2 | 2 | 2 | 2 |
|  | Zinc oxide |  | 2 | 2 | 2 | 2 | 2 | 2 | 2 | 2 | 2 | 2 | 2 |
| Physical properties | Foaming ratio | % | 20 | 0 | 20 | 20 | 20 | 20 | 20 | 20 | 20 | 20 | 20 |
| Evaluation | Wear resistance | Index | 100 | 117 | 90 | 99 | 98 | 95 | 105 | 103 | 107 | 110 | 119 |
|  | On-ice performance | Index | 124 | 110 | 135 | 135 | 140 | 130 | 130 | 128 | 120 | 117 | 112 |

*1 NR (natural rubber): Tg=−60° C.

*2 Modified SBR1 (Modified styrene-butadiene copolymer rubber 1): modified styrene-butadiene copolymer rubber synthesized by the method described below, Tg=−47° C., St+Vi/2=39.5

*3 Modified SBR2 (Modified styrene-butadiene copolymer rubber 2): modified styrene-butadiene copolymer rubber synthesized by the method described below, Tg=−63° C., St+Vi/2=30

*4 BR (polybutadiene rubber): cis-1,4-polybutadiene rubber, product name "UBEPOL 150L" manufactured by Ube industries, Ltd., Tg=−110° C.

*5 Modified BR1 (Modified polybutadiene rubber 1): modified polybutadiene rubber synthesized by the method described below. Tg=−95° C.

*6 Modified BR2 (Modified polybutadiene rubber 2): modified polybutadiene rubber synthesized by the method described below, Tg=−95° C.

*7 Carbon black: "N134" manufactured by Asahi Carbon Co., Ltd., $N_2SA$=146 $m^2/g$

*8 Silica: Product name "Nipsil AQ" manufactured by Tosoh Silica Corporation, CTAB specific surface area=150 $m^2/g$, nitrogen adsorption specific surface area ($N_2SA$)=200 $m^2/g$

*9 Micro-diameter silica: Product name "Nipsil HQ" manufactured by Tosoh Silica Corporation. CTAB specific surface area=200 $m^2/g$, nitrogen adsorption specific surface area ($N_2SA$)=250 $m^2/g$

*10 Silane coupling agent: "Si69" manufactured by Evonic industries, AG

*11 Process oil: Naphthene-based process oil, product name "Diana Process Oil NS-24" manufactured by Idemitsu Kosan Co., Ltd., pour point=−30° C.

*12 Anti-oxidant IPPD: N-isopropyl-N'-phenyl-p-phenylenediamine

*13 $C_5$ resin: Product name "Escorez 1102" manufactured by Tonen Chemical Corporation

*14 Low molecular weight polybutadiene: low molecular weight polybutadiene synthesized by the method described below

*15 Foaming agent DNPT: dinitrosopentamethylenetetramine

*16 Hydrophilic short fiber: hydrophilic short fiber manufactured by the method described below

*17 Vulcanization accelerator MBTS: dibenzothiazyl disulfide

*18 Vulcanization accelerator CBS: N-cyclohexyl-2-benzothiazylsulfenamide

<Modified Styrene-Butadiene Copolymer Rubber 1>

2500 g of cyclohexane, 16.25 g of tetrahydrofuran, 75 g of styrene, 415 g of 1,3-butadiene, and 0.05 g of divinylbenzene are charged into a nitrogen-substituted autoclave reactor having inner volume: 5 L. After adjusting the temperature of the mixture in the reactor at 15° C., 330 mg of n-butyllithium is added to the mixture, so that polymerization was started. The polymerization is carried out under a thermally-insulated condition and the maximum temperature reaches 90° C. 10 g of butadiene is added to the reactant when the polymerization conversion ratio reaches 99% and the polymerization reaction is allowed to proceed for five more minutes. Then, 60 mg of tin tetrachloride was added and reacted with the reactant substance for 5 minutes and subsequently 1255 mg of N,N-bis(trimethylsilyl)aminopropylmethyldiethoxysilane is added and reacted with the reactant substance for 15 minutes. Thereafter, 2,6-di-tert-butyl-p-cresol is added to the polymer solution. Next, the solvent is removed by steam stripping and the rubber is dried by a heating roll of which temperature is adjusted at 110° C., whereby modified styrene-butadiene copolymer rubber 1 is obtained.

Modified styrene-butadiene copolymer rubber 1 thus obtained has modification rate: 1.1, content of bonded styrene: 15 mass %, vinyl bond content of the butadiene part: 49 mass %, the weight average molecular weight (Mw): 370,000, and glass transition temperature: −47° C.

<Modified Styrene-Butadiene Copolymer Rubber 2>

2500 g of cyclohexane, 7.5 g of tetrahydrofuran, 50 g of styrene, 440 g of 1,3-butadiene, and 0.05 g of divinylbenzene are charged into a nitrogen-substituted autoclave reactor having inner volume: 5 L. After adjusting the temperature of the mixture in the reactor at 20° C., 330 mg of n-butyllithium is added to the mixture, so that polymerization is started. The polymerization is carried out under a thermally-insulated condition and the maximum temperature reaches 90° C. 10 g of butadiene is added to the reactant when the polymerization conversion ratio reaches 99% and the polymerization reaction is allowed to proceed for five more minutes. Then, 60 mg of tin tetrachloride is added and reacted with the reactant substance for 5 minutes and subsequently 1255 mg of N,N-bis(trimethylsilyl)aminopropylmethyldiethoxysilane is added and reacted with the reactant substance for 15 minutes. Thereafter, 2,6-di-tert-butyl-p-cresol is added to the polymer solution. Next, the solvent is removed by steam stripping and the rubber is dried by a heating roll of which temperature is adjusted at 110° C., whereby modified styrene-butadiene copolymer rubber 2 is obtained.

Modified styrene-butadiene copolymer rubber 2 thus obtained has modification rate: 1.1, content of bonded styrene: 10 mass %, vinyl bond content of the butadiene part: 40 mass %, the weight average molecular weight (Mw): 390,000, and glass transition temperature: −63° C.

<Modified Polybutadiene Rubber 1>

283 g of cyclohexane, 100 g of 1,3-butadiene monomer, and 0.015 mmol of 2,2-ditetrahydrofurylpropane are charged as a cyclohexane solution into a dry, nitrogen-substituted pressure-resistant glass vessel having inner volume: 900 mL. 0.50 mmol of n-butyllithium (n-BuLi) is added to the mixture and then polymerization is carried out in a hot water bath (50° C.) equipped with a stirrer for 4.5 hours. The polymerization conversion ratio is substantially 100%.

Next, a cyclohexane solution of 0.50 mmol of 3-[N,N-methyl(trimethylsilyl)amino]propyldimethylethoxysilane is added to the polymerization system and the mixture is stirred for 30 minutes at 50° C. Thereafter, 0.5 mL of an isopropanol solution of 2,6-di-tert-butyl-p-cresol (BHT) (BHT concentration: 5 mass %) is added to the polymer solution to stop the reaction. The resulting substance is dried according to the conventional method, whereby polybutadiene rubber 1 is obtained.

Vinyl bond (1,2-bond) content of modified polybutadiene rubber 1 thus obtained, determined from an integration ratio in $^1$H-NMR spectra [in $CDCl_3$ measured by "Alpha 400 MHz" NMR analyzer, manufactured by JEOL Ltd.], is 20 mass %. Further, the weight average molecular weight (Mw) of modified polybutadiene rubber 1 is 300,000.

Yet further, modified polybutadiene rubber 1 thus obtained has a modification rate: 0.8 and glass transition temperature: −95° C.

<Modified Polybutadiene Rubber 2>

283 g of cyclohexane, 50 g of 1,3-butadiene, 0.0057 mmol of 2,2-ditetrahydrofurylpropane, and 0.513 mmol of hexamethyleneimine are charged as a cyclohexane solution into a dry, nitrogen-substituted pressure-resistant glass vessel having inner volume: 900 mL, 0.57 mmol of n-butyllithium (n-BuLi) is added to the mixture and then polymerization reaction is carried out in a hot water bath (50° C.) equipped with a stirrer for 4.5 hours. The polymerization conversion ratio is substantially 100%.

Next, a cyclohexane solution of 0.100 mmol of tin tetrachloride is added to the polymerization system and the mixture is stirred for 30 minutes at 50° C. Thereafter, 0.5 mL of an isopropanol solution of 2,6-di-tert-butyl-p-cresol (BHT) (BHT concentration: 5 mass %) is added to the polymer solution to stop the polymerization reaction. The resulting substance is dried according to the conventional method, whereby polybutadiene rubber 2 is obtained.

Vinyl bond (1,2-bond) content in the butadiene unit of modified polybutadiene rubber 2 thus obtained, determined from an integration ratio in $^1$H-NMR spectra [in $CDCl_3$ measured by "Alpha 400 MHz" NMR analyzer, manufactured by JEOL Ltd.], is 14 mass %.

Further, modified polybutadiene rubber 2 thus obtained has a modification rate: 1.2 and glass transition temperature: −95° C.

<Low Molecular Weight Polybutadiene>

283 g of cyclohexane, 25 g of 1,3-butadiene monomer, and 0.015 mmol of 2,2-ditetrahydrofurylpropane are charged as a cyclohexane solution into a dry, nitrogen-substituted pressure-resistant glass vessel having inner volume: 900 mL. 0.50 mmol of n-butyllithium (n-BuLi) is added to the mixture and then polymerization is carried out in a hot water bath (50° C.) equipped with a stirrer for 4.5 hours. The polymerization conversion ratio is substantially 100%.

Thereafter, 0.5 mL of an isopropanol solution of 2,6-di-tert-butyl-p-cresol (BHT) (BHT concentration: 5 mass %) is added to the polymer solution to stop the reaction. The resulting substance is dried according to the conventional method, whereby low molecular polybutadiene (in a liquid state at the room temperature) is obtained. The low molecular polybutadiene thus obtained has vinyl bond content: 20 mass % and the weight average molecular weight (Mw): 80,000.

<Hydrophilic Short Fiber>

Hydrophilic short fibers, having a polyethylene coating layer formed thereon, are manufactured according to the manufacturing example 3 disclosed in JP 2012-219245 A by: charging 40 parts by mass of polyethylene ["NOVATEC HJ1360" (MFR: 5.5, melting point: 132° C.) manufactured by Japan Polyethylene Corporation] and 40 parts by mass of ethylene-vinyl alcohol copolymer ["EVAL F104B" (MFR: 4.4, melting point: 183° C.) manufactured by Kuraray Co., Ltd.] into hoppers of two twin screw extruders, respectively; simultaneously extruding polyethylene and ethylene-vinyl alcohol copolymer from outlet ports of the dies, respectively; and cutting the fiber thus obtained into 3 mm length pieces by a conventional method.

It is understood from the results of Examples 1 to 11 shown in Table 2 that use of the rubber composition according to the present disclosure can significantly improve on-ice performance of a tire, while suppressing deterioration of wear resistance of the tire.

Further, it is understood from the results of Comparative Examples 1 to 10 that a magnitude of improvement of the on-ice performance of a tire shrinks and/or wear resistance of the tire decreases when the rubber composition fails to contain the modified diene polymer (B) satisfying the formula (i).

INDUSTRIAL APPLICABILITY

The rubber composition of the present disclosure can be applied to a tire and tread rubber of a studless tire in particular. The tire of the present disclosure is useful as a studless tire.

The invention claimed is:

1. A rubber composition having: at least three types of diene polymers forming a plurality of polymer phases which are immiscible with each other; and silica, wherein:
   each of the at least three types of diene polymers has content of ≥10% by mass with respect to the total mass of the diene polymers;
   content of the diene polymer (A) having the lowest glass transition temperature (Tg) among the diene polymers each having content of ≥10% by mass with respect to the total mass of the diene polymers is ≥85% by mass with respect to the content of the diene polymer having the highest content among the diene polymers other than the diene polymer (A);
   among the diene polymers each having content of ≥10% by mass with respect to the total mass of the diene polymers, the diene polymer (C) has the highest glass transition temperature (Tg) and a diene polymer (B), which is other than the diene polymer (A) and has glass transition temperature (Tg) lower than that of the diene polymer (C) having the highest glass transition temperature (Tg), has been modified by a compound containing silicon atom;

the diene polymer (B) is a copolymer of a conjugated diene compound and styrene and satisfies formula (i) shown below:

$$St+Vi/2 \leq 33 \qquad (i)$$

(In the formula, "St" represents content of bonded styrene (mass %) of the diene polymer (B) and "Vi" represents vinyl bond content (mass %) of the conjugated diene compound part of the diene polymer (B)); and the silica has content of ≥25 parts by mass with respect to the total mass or 100 parts by mass of the diene polymers.

2. The rubber composition of claim 1, which further contains 25 parts by mass or more of carbon black with respect to the total mass or 100 parts by mass of the diene polymers.

3. The rubber composition of claim 1, which further contains a foaming agent.

4. The rubber composition of claim 1, which has gas bubble-derived holes formed therein.

5. The rubber composition of claim 1, which further contains a $C_5$ resin.

6. The rubber composition of claim 1, which further contains hydrophilic short fibers.

7. The rubber composition of claim 1, wherein the diene polymer (B) has a styrene skeleton and a butadiene skeleton.

8. The rubber composition of claim 7, wherein the diene polymer (B) is styrene-butadiene copolymer rubber.

9. The rubber composition of claim 1, wherein the diene polymer (C) having the highest glass transition temperature (Tg) has an isoprene skeleton.

10. The rubber composition of claim 9, wherein the diene polymer (C) having the highest glass transition temperature (Tg) is natural rubber.

11. The rubber composition of claim 1, wherein the diene polymer (A) having the lowest glass transition temperature (Tg) has been modified by a compound containing at least one of tin atom and nitrogen atom.

12. The rubber composition of claim 11, wherein the diene polymer (A) having the lowest glass transition temperature (Tg) contains both tin atom and nitrogen atom.

13. The rubber composition of claim 11, wherein a modification rate at which the diene polymer (A) having the lowest glass transition temperature (Tg) has been modified by the compound containing at least one of tin atom and nitrogen atom is in the range of ≥1.1 and ≤2.5.

14. The rubber composition of claim 1, wherein the diene polymer (A) having the lowest glass transition temperature (Tg) has a butadiene skeleton.

15. The rubber composition of claim 14, wherein the diene polymer (A) having the lowest glass transition temperature (Tg) is polybutadiene rubber.

16. The rubber composition of claim 14, wherein the diene polymer (B) has a styrene skeleton and a butadiene skeleton.

17. The rubber composition of claim 14, wherein the diene polymer (C) having the highest glass transition temperature (Tg) has an isoprene skeleton.

18. The rubber composition of claim 14, which further contains 25 parts by mass or more of carbon black with respect to the total mass or 100 parts by mass of the diene polymers.

19. The rubber composition of claim 14, wherein the diene polymer (A) having the lowest glass transition temperature (Tg) has been modified by a compound containing at least one of tin atom and nitrogen atom.

20. A tire, which uses the rubber composition of claim 1.

* * * * *